United States Patent
Carter et al.

(10) Patent No.: US 9,562,803 B2
(45) Date of Patent: Feb. 7, 2017

(54) MATERIAL FEEDER SYSTEM AND METHOD OF USE

(71) Applicants: Clay Carter, North Logan, UT (US); Janos Lakatos, Mendon, UT (US); Lane Nielson, Preston, ID (US); Dan Saxton, Providence, UT (US); Clay Slade, North Logan, UT (US)

(72) Inventors: Clay Carter, North Logan, UT (US); Janos Lakatos, Mendon, UT (US); Lane Nielson, Preston, ID (US); Dan Saxton, Providence, UT (US); Clay Slade, North Logan, UT (US)

(73) Assignee: CJC Holdings, LLC, Logan, UT (US)

( * ) Notice: Subject to any disclaimer, the term of this patent is extended or adjusted under 35 U.S.C. 154(b) by 539 days.

(21) Appl. No.: 13/930,209

(22) Filed: Jun. 28, 2013

(65) Prior Publication Data

US 2013/0284520 A1    Oct. 31, 2013

Related U.S. Application Data

(63) Continuation of application No. PCT/US2012/021173, filed on Jan. 13, 2012.

(60) Provisional application No. 61/433,056, filed on Jan. 14, 2011.

(51) Int. Cl.
| | |
|---|---|
| *G01G 13/02* | (2006.01) |
| *B65G 29/00* | (2006.01) |
| *F42B 33/02* | (2006.01) |
| *G01G 13/285* | (2006.01) |

(52) U.S. Cl.
CPC .............. *G01G 13/022* (2013.01); *B65G 29/00* (2013.01); *F42B 33/0207* (2013.01); *F42B 33/0285* (2013.01); *F42B 33/0292* (2013.01); *G01G 13/2851* (2013.01)

(58) Field of Classification Search
CPC .............. F42B 33/0207; F42B 33/0285; F42B 33/0292; B65G 29/00; G01G 13/022; G01G 13/2851
See application file for complete search history.

(56) References Cited

U.S. PATENT DOCUMENTS

| | | | | |
|---|---|---|---|---|
| 1,997,791 | A | * | 4/1935 | Hoberg ..................... A01C 7/18 222/222 |
| 2,548,245 | A | * | 4/1951 | Stevens ..................... B02B 3/00 222/350 |

(Continued)

*Primary Examiner* — Natalie Huls
(74) *Attorney, Agent, or Firm* — Preston P. Frischknecht; Project CIP

(57) ABSTRACT

This invention relates to a material feeder system and method of use. The present invention relates particularly to a particulate feeder system that includes, among other features, one or more: feeder assemblies for advancing material that incorporate a spool having a channel disposed within its outer circumference for advancing material, the spool having a plurality of circumferentially spaced contours configured so as to not form transverse barriers within the channel; motors configured to connect to the feeder assemblies; and scales for weighing advanced material. The system also includes a computer in communication with the one or more motors and scales, and capable of performing operations to advance a predetermined material weight as well as various related operations. The invention also includes a method using the above.

22 Claims, 9 Drawing Sheets

(56) References Cited

U.S. PATENT DOCUMENTS

| | | | | |
|---|---|---|---|---|
| 3,593,891 A * | 7/1971 | Kidd | B65G 53/4633 | 222/367 |
| 3,608,787 A * | 9/1971 | Grataloup | A01C 7/046 | 222/342 |
| 4,171,071 A * | 10/1979 | Cumpston | B65G 47/19 | 222/167 |
| 4,345,858 A * | 8/1982 | Barlow | G01G 19/32 | 222/77 |
| 4,421,412 A * | 12/1983 | Hold | B29B 13/022 | 264/349 |
| 4,427,136 A * | 1/1984 | MacKay | G01F 11/24 | 222/368 |
| 4,429,660 A * | 2/1984 | Olson | A01K 61/02 | 119/51.04 |
| 4,780,028 A * | 10/1988 | McLemore | B65G 53/525 | 406/63 |
| 4,843,579 A * | 6/1989 | Andrews | G01G 13/04 | 177/1 |
| 4,920,853 A * | 5/1990 | Odom | F42B 33/0292 | 86/31 |
| 5,024,173 A * | 6/1991 | Deckler | F16D 11/14 | 111/178 |
| 5,024,356 A * | 6/1991 | Gerling | A01C 15/04 | 222/312 |
| 5,209,607 A * | 5/1993 | Wei | B01J 8/002 | 222/636 |
| 2004/0031819 A1* | 2/2004 | Smiley | G01F 11/18 | 222/449 |
| 2005/0145651 A1* | 7/2005 | Katefidis | B05B 7/144 | 222/145.5 |
| 2005/0247734 A1* | 11/2005 | Kato | B03C 1/14 | 222/190 |
| 2010/0077948 A1* | 4/2010 | Horsch | A01C 7/046 | 111/130 |
| 2013/0139675 A1* | 6/2013 | Baxter | F42B 33/001 | 86/31 |
| 2013/0146797 A1* | 6/2013 | Schneider | F16K 27/00 | 251/304 |
| 2014/0000390 A1* | 1/2014 | Laubstein | B01L 3/021 | 73/863.44 |

* cited by examiner

MATERIAL FEEDER SYSTEM AND METHOD OF USE

CROSS-REFERENCE TO RELATED APPLICATIONS

This application is a continuation of, and claims priority from, U.S. Provisional Application No. 61/433,056 and PCT/US12/21173, currently pending, and incorporated herein by reference.

TECHNICAL FIELD OF THE INVENTION

This invention relates to a material feeder system and method of use. The present invention relates particularly to a particulate feeder system that includes, among other features, one or more: feeder assemblies for advancing material; motors configured to connect to the feeder assemblies; and scales for weighing advanced material. The system also includes a computer in communication with the one or more motors and scales, and capable of performing operations to advance a predetermined material weight as well as various related operations. The invention also includes a method using the above.

BACKGROUND OF THE INVENTION

In various areas of manufacturing, mechanisms that measure and dispense finite quantities of material quickly and accurately are needed. Although many relevant applications exist, one specific example is loading material like explosive powders into charge cartridges for safety devices such as automobile air bags.

Unfortunately, there is a dearth of existing machinery and methods able to reliably, quickly, safely, and accurately sort small amounts of such material in a precise fashion.

BRIEF SUMMARY OF THE INVENTION

In accordance with the above, a new and innovative material feeder system and method of use is provided. The problem of measuring and dispensing finite quantities of material in a reliable, quick, safe, and accurate matter is solved through a material feeder system with one or more feeder assemblies for advancing material that incorporate a spool having a channel disposed within its outer circumference for advancing material, the spool having a plurality of circumferentially spaced contours configured so as to not form transverse barriers within the channel; motors configured to connect to the one or more feeder assemblies; and scales for weighing advanced material. The system also includes a computer in communication with the one or more motors and scales and capable of performing operations as well as various related operations. The invention also includes a method using the above. The system and method in its various embodiments are particularly adept at advancing particulate material and is capable of doing so in a continuous, unbroken fashion.

DETAILED DESCRIPTION

The present invention in its various embodiments, some of which are depicted in the figures herein, is an innovative material feeder system and method of use.

Figure 1:
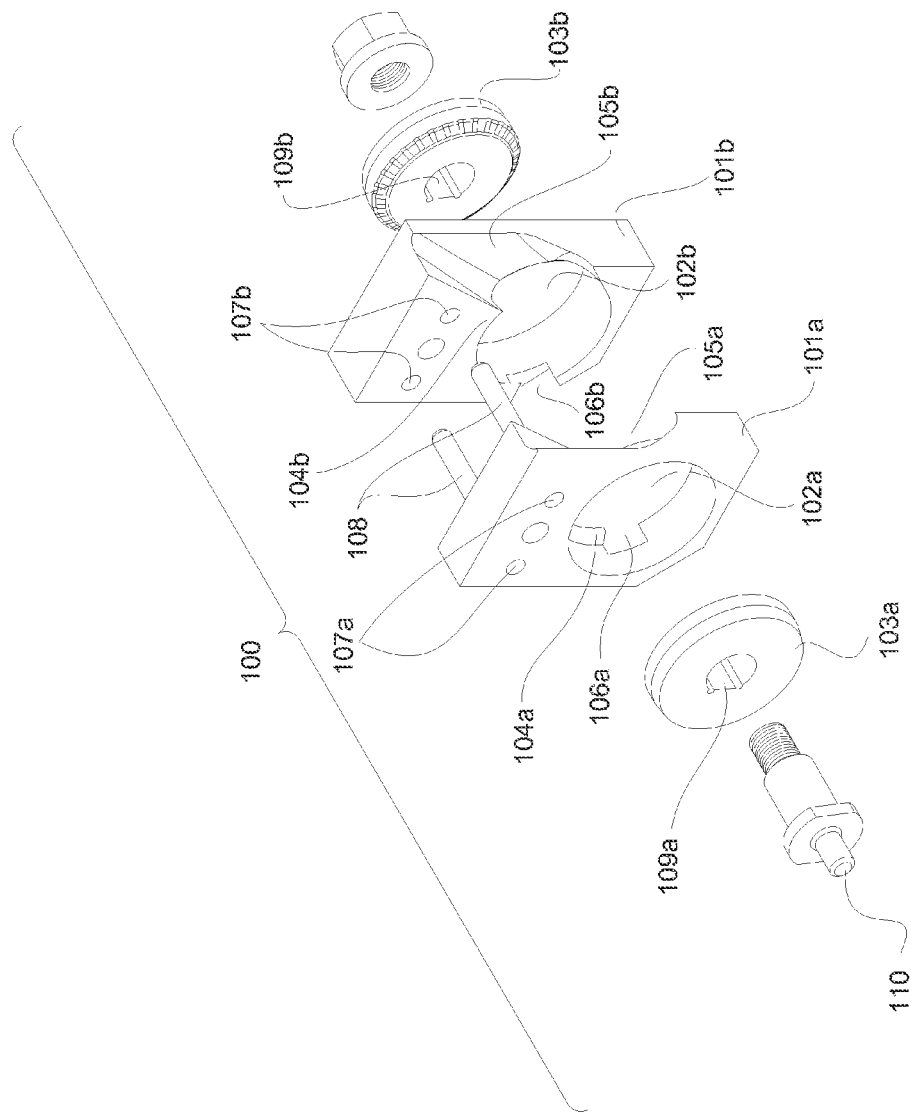
FIG. 1 is an exploded view of one embodiment of the feeder assembly of the invention.
Figure 2:
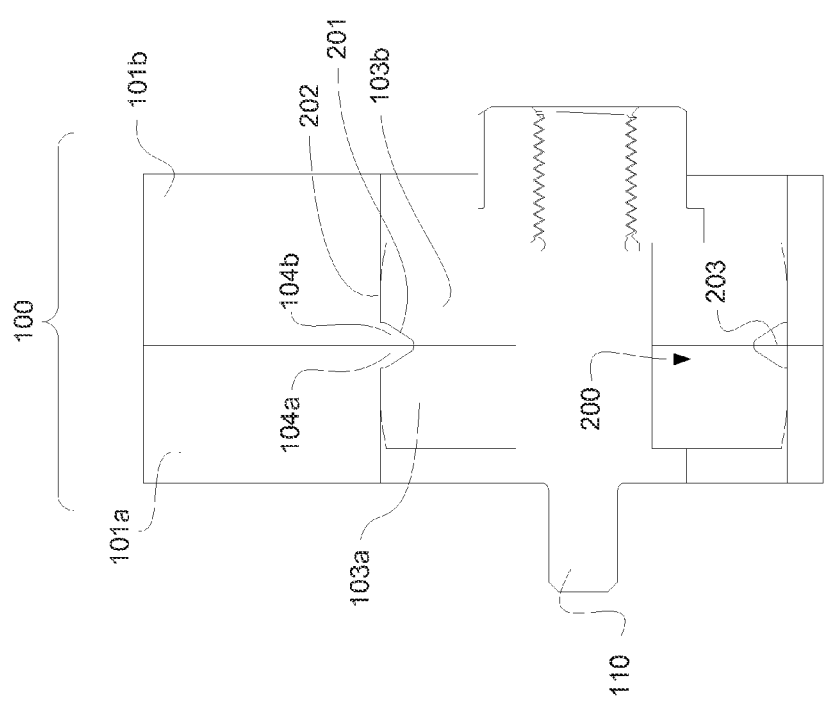
FIG. 2 is a cross-section view of one embodiment of the feeder assembly within the system of the invention.

Referring now to FIG. 1, the system includes one or more feeder assemblies [100] for receiving and advancing material. The feeder assembly [100] includes a housing [101a, 101b] with a bore [102a, 102b] capable of fitting with a material feeder spool [103a, 103b]. In various embodiments, the bore is located towards the lower end of the housing [101a, 101b]. In some embodiments of the invention, the housing [101a, 101b] is comprised of two or more pieces, including a left [101a] and right side [101b]. In various embodiments, the housing [101a, 101b] includes a machined key portion [104a, 104b] along a portion of the bore's circumference. In preferred embodiments, the key is an integrally formed part of the housing. The curvature and dimensions of the machined key portion are capable of creating a close fit with a corresponding portion of the feeder spool [103a, 103b] when the feeder spool is placed within the housing [101a, 102b]. An example of this fit is shown in FIG. 2.

When the feeder spool [103a, 103b] is placed within the housing [101a, 102b], the machined key portion [104a, 104b] functions as a barrier to prevent the accumulation, entry or transport of material in a top portion of the housing and/or spool between an inlet and outlet (mentioned below). Moreover, the machined key portion assures that material is transferred efficiently through the feeder assembly, including by eliminating extraneous components and fittings that would otherwise allow material to accumulate in the feeder assembly during operation.

Referring again to FIG. 1, in various embodiments, the housing [101a, 101b] also includes an inlet aperture [105a, 105b] for receiving material. The inlet aperture is generally located towards the upper end of the housing [101a, 101b] and extends downward through the housing to the bore [102a, 102b]. In the particular embodiment of FIG. 1, the inlet aperture forms an angled funnel. The housing [101a, 101b], also includes an outlet aperture [106a, 106b] which, in various embodiments, is generally located on the side of the housing that is opposite the inlet aperture [105a, 105b]. The shape and structure of the inlet [105a, 105b] and outlet [106a, 106b] apertures vary across embodiments, but the general configuration of the apertures allows for the passage of material into and out of the housing [101a, 101b] through gravitation force. In particular, material may be introduced from the inlet aperture to the feeder spool through gravity alone. (See also FIGS. 4-6). In some embodiments of the invention, additional apertures [107a, 107b] may be used to receive pins [108] or other fasteners for locating, indexing, and or fitting some or all of the components of the housing [101a, 101b].

In various embodiments, the feeder spool [103a, 103b] may be comprised of two or more pieces, including a left [103a] and right [103b] side, and configured to rotate within the bore. Referring now to FIG. 2, regardless of the number of pieces comprising the feeder spool [103a, 103b] in a feeder assembly [100], the spool in cross section contains one or more inner surfaces [201] with a diameter that is generally smaller than that of an adjacent outer surface or surfaces [202] of the feeder spool [103a, 103b]. Material [200] that enters the housing [101a, 101b] is advanced along a channel [203] disposed within the outer circumference of the spool, the material being advanced as the spool [103a, 103b] is rotated. The channel [203] is shaped to achieve a close fit with the key [104a, 104b], such that, in preferred embodiments, material is kept from entering into or being transported within the spool along a portion of the bore. Depending on the embodiment, in cross-section the diameter of the outer surface of the spool may generally taper to the smaller diameter of the inner surface [201], as depicted in FIG. 2. Also, in cross-section the diameter of the outer surface [202] may include one or more widths of essentially consistent diameter before tapering to the smaller diameter of the inner surface [201], as depicted in FIG. 2. A number of different configurations may be used to achieve a variety of different types of channels within the feeder spool [103a, 103b].

Figure 3:
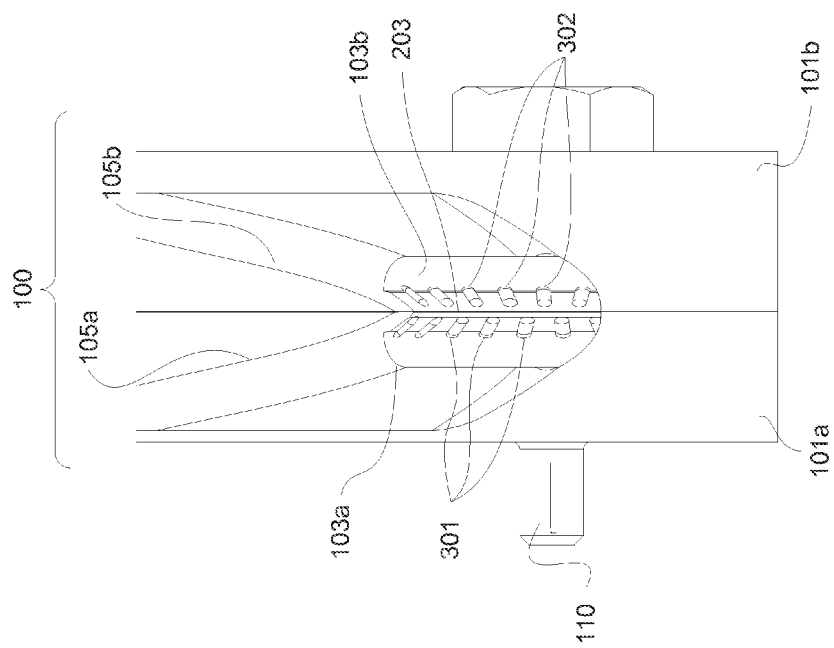
FIG. 3 is a cross-section/partial interior perspective view of one embodiment of the feeder assembly within the system of the invention.

Referring now to FIG. 3, in several embodiments of the invention, a plurality of contours [301, 302] is disposed along one or more inner surfaces of the feeder spool [103a, 103b] and within the channel [203]. The contours in FIG. 3 are grooves that are not transverse barriers within the channel and do not obstruct the channel [203], but any number of geometric configurations may be used for the contours without departing from the purpose and scope of the invention. The contours [301, 302] are generally configured to optimize the advancement of material traveling within the channel [203] of the spool by providing additional surface area and geometry that tends to achieve fraction or grab the material. In preferred embodiments, the non-transverse barrier configuration of the contours provides a continuous, unbroken stream of metered material when the system is in a continuous operation mode. This configuration is in marked contrast to less precise, star feeder or measured batch-type spools, which meter in discrete groups of particulate matter. In various embodiments, and particularly as depicted in FIG. 3, contours [301, 302] may be equally or unequally, and/or circumferentially spaced and disposed around the entire inner surface circumference of the feeder spool [103a, 103b].

Depending on the particular embodiment of the invention, a first set of contours disposed on one inner surface side [301] of the feeder spool may be offset from a second set of contours located on the opposite inner surface side [302] of the feeder spool. Contours offset in this manner function to provide a more consistent width within the channel [203] of the feeder spool [103a, 103b], thereby allowing for more consistent advancement of material traveling within and along the channel [203].

In various embodiments of the invention, one or more apertures (see FIG. 1) [109a, 109b] may be disposed within the feeder spool [103a, 103b] for receiving a coupler shaft [110] to rotate the feeder spool [103a, 103b] within the housing [101a, 101b]. The shaft is in communication with the feeder spool and disposed coaxially relative to the apertures. The shaft [110] fits the feeder spool [103a, 103b] and housing [101a, 101b] together, such that rotation of the shaft [110] also rotates the feeder spool [103a, 103b] within the housing, which is stationary in the illustrated embodiment. It is recognized that a variety of mechanisms may be used to couple the components. The embodiment of FIG. 1 uses a modified bolt shaft and nut. Any number of pins, washers, or similar elements may be used to fit the feeder spool and housing. When removably fitted, the feeder spool [103a, 103b] freely rotates within the housing, and is able to receive material into the input aperture [105a, 105b] and, when material is in contact with the spool, convey that material within the channel of the feeder spool as the spool is rotated, until the material reaches the outlet aperture [106a, 106b], at which point it exits the housing [101a, 101b] by gravitational force.

Figure 4:
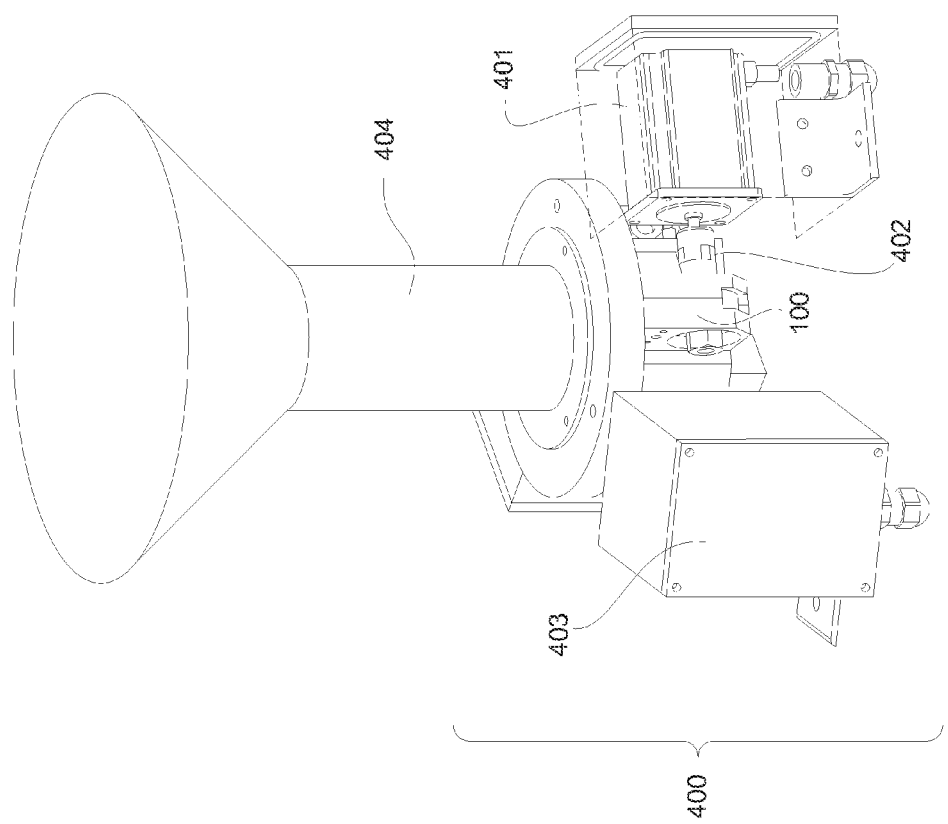
FIG. 4 is a perspective view of one embodiment of a plurality of feeder assemblies and motors within the system of the invention.
Figure 5:
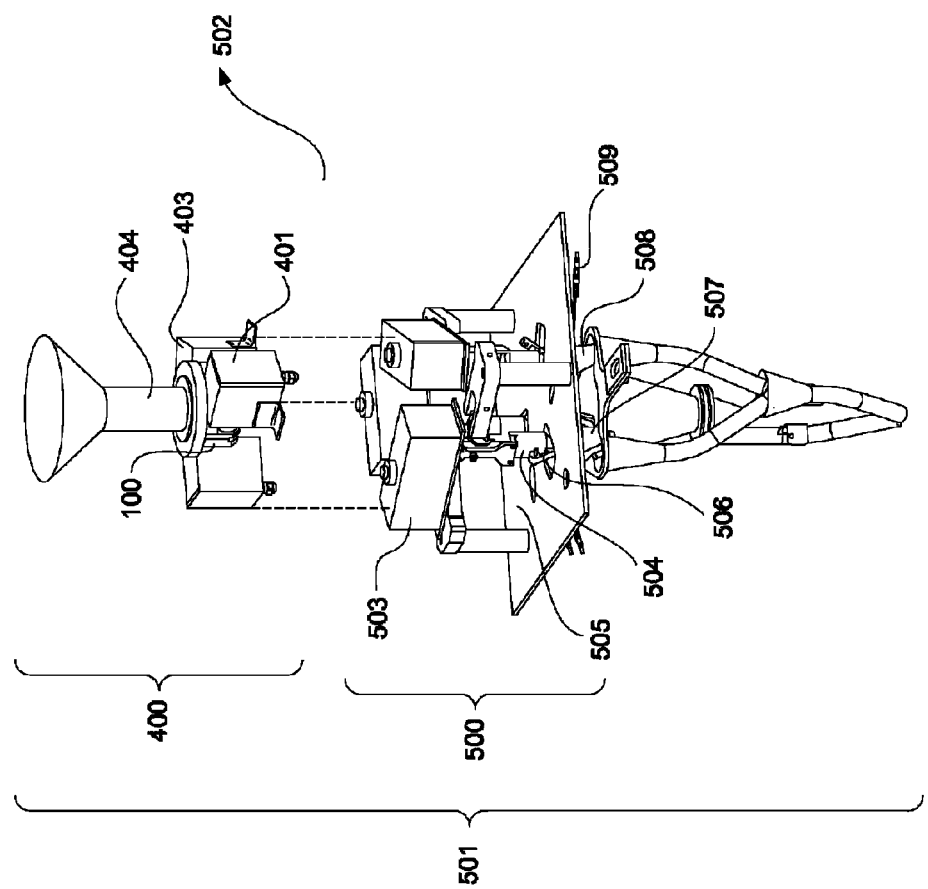
FIG. 5 is a perspective view of one embodiment of the material feeder system.

Referring now to FIGS. 4 and 5, in various embodiments, a plurality of feeder assemblies may be incorporated into a feeder assembly platform [400] and a broader system [501]. Depending on the embodiment, a broader material feeder system [501] may include one or more: feeder assemblies [100], motors [401] connected to the shaft of each feeder assembly and configured to rotate a feeder spool within the feeder assembly [100] via a shaft [402], thereby allowing gravity fed material to be advanced as the feeder spool is rotated; a computer [502] in communication with the one or more motors [401] and configured to control operation of the same; a user interface (not shown) in communication with the computer (not shown); receptacles [504] for receiving material exited from the housing; and weigh scales [503] in communication with the computer [502] and capable of weighing dispensed material within the receptacles; and structures [506-509] for further sorting of advanced material. It is understood that one or more of the abovementioned components may be connected via any number of wired or wireless means.

With attention to FIG. 4, one embodiment of a feeder assembly platform [400] using the feeder assembly is shown. In the configuration of FIG. 4, three feeder assemblies (one shown [100], two others hidden), are spaced concentrically around and connected and/or affixed to a bulk material funnel [404], which feeds material to each feeder assembly's inlet aperture. In various embodiments, the bulk splitter structure (not shown) is placed at the bottom interior of the funnel to direct material to each feeder assembly. Depending on the particular application, more or fewer feeder assemblies may be desired, particularly as the number of feeder assemblies determines the amount and rate of material advanced when the system is in operation. Any number of feeder assemblies and any number of configurations may be used without departing from the purpose and scope of the invention.

In the embodiment of FIG. 4, each feeder assembly [100] is connected to its own motor [401] by the shaft. In one embodiment of the invention, the motor [401] is a stepper motor wherein there are five thousand (5,000) steps per every full revolution of the feeder spool within the housing. In some embodiments, the stepper motor is enclosed within a casing [403] to buffer exposure of moving and/or heated parts to potentially volatile material. When the feeder assembly [100] is in direct contact with the material supply, actuation of the motor [401] allows material to enter into and travel within the feeder assembly [100].

Referring now to FIG. 5, a feeder assembly platform [400] and scale platform [500] may be combined to achieve a system [501] with much greater functionality. The scale platform [500] includes one or more scales [503], each attached to a respective receptacle [504], via a bracket [505]. When the feeder assembly platform [400] is combined with the scale platform [500], each outlet aperture of a feeder assembly [100] is respectively positioned such that operation of the corresponding motor will advance material which will exit into the receptacle [504]. Any materials that become located in the receptacle [504] may then be weighed by the corresponding scale [503]. Any number of scales, receptacles, and configurations of the same may be used without departing from the purpose and scope of the invention. For example, in certain embodiments, the feeder assembly platform may have only one feeder assembly, and the scale platform may only have one receptacle and scale. Likewise, other embodiments may have four or more feeder assemblies, receptacles, and scales.

In various embodiments of the invention, a release [506] may be located within the receptacle that, when engaged, exits material from the receptacle to a different location, typically, although not always, for further sorting. The structure of the release may include a pneumatically operated trap door located at the bottom of the receptacle [504]. In the embodiment of FIG. 5, the scale platform [500] also has funnel structures [507, 508] capable of variable positioning to further sort material. For example, a first funnel structure [507] is depicted as placed in a position to direct material into a first location and a second funnel structure [508] is placed in a position to direct material into a second location. However, the first funnel structure [507] is also capable of being repositioned to direct material to the second location and the second funnel structure [508] is also capable of being repositioned to direct material to the first location. In one embodiment, each funnel is mounted on a pneumatic rotator capable of moving funnel structures among positions. Any number of means for directing and sorting material, including funnel structures, numbers of funnel structures, and configurations of the same may be used without departing from the purpose and scope of the invention. In various embodiments, sensors [509] may also be attached to the funnel structures and used to locate the position of the funnel structures in space, including through use of the computer [502] discussed below.

Figure 6:
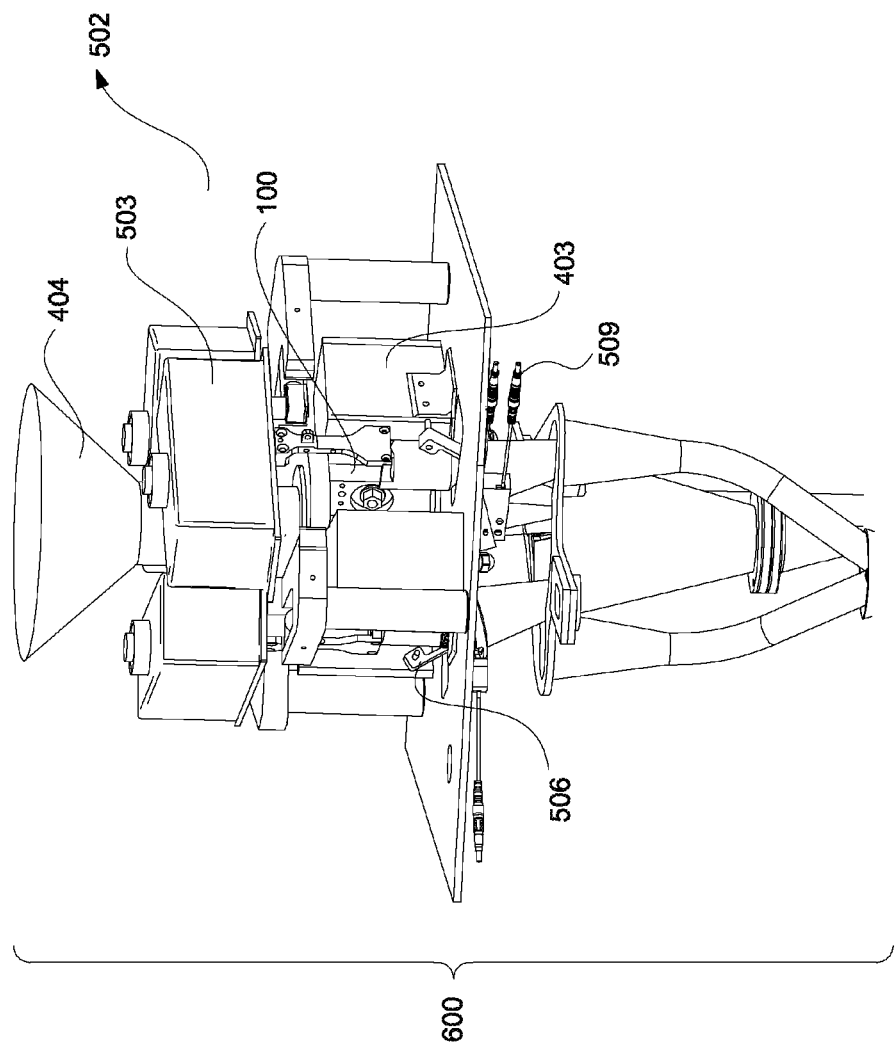
FIG. 6 is a perspective view of one embodiment of the material feeder system.

With attention now to FIG. 6, one embodiment of a fully assembled system [600] is shown.

In various embodiments of the invention, the system is capable of receiving commands and/or operating various components of the system to deliver rapid and accurate measurements of material by use of a computer [502] with memory for storing modules for program control and manipulating data in memory. The computer is in wired or wireless communication with the one or more scales [503], motors [401], releases [506], and/or funnel structures [507, 508], and is capable of performing a variety of functions.

Figure 7:
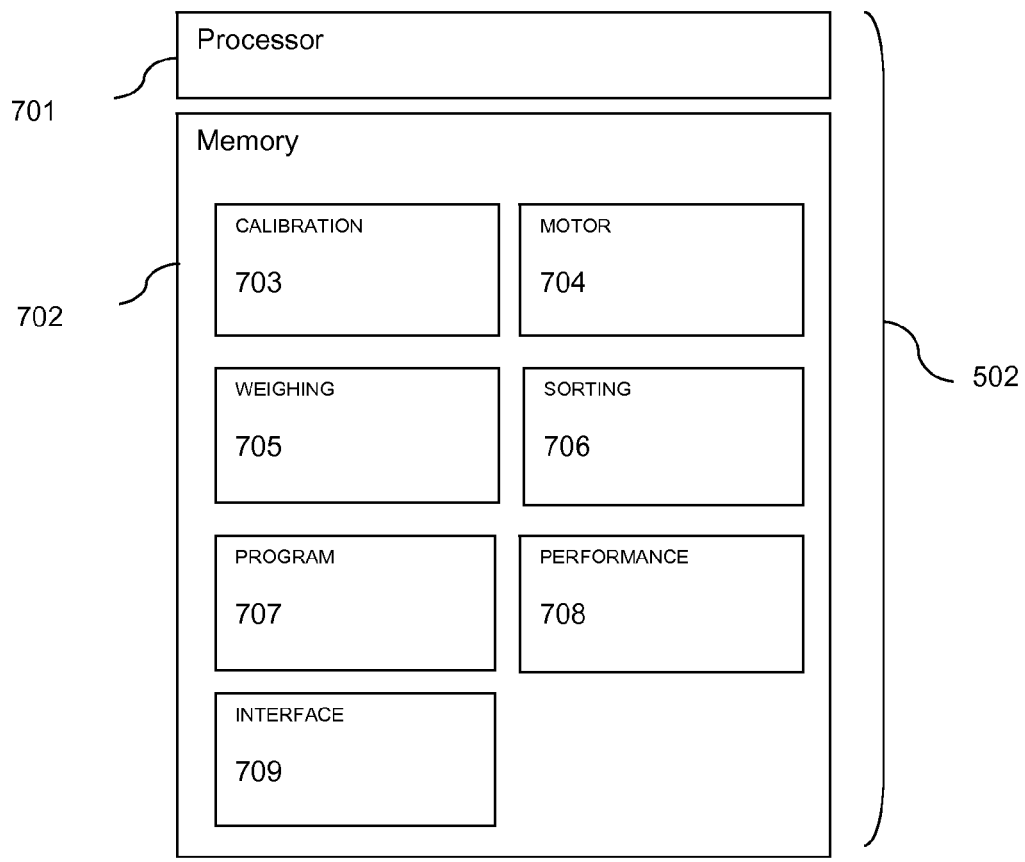
FIG. 7 is a block diagram of the computer in one embodiment of the material feeder system.

FIG. 7 is a block diagram of the computer [502] in one embodiment of the invention. In various embodiments, the computer [502] is a special purpose or programmable logic controller ("PLC") with a processor [701] coupled to a memory [702] and programmed to perform a variety of tasks to advance material and otherwise operate the various components of the material feeder system. Such tasks may include, but are not limited to: calibrating the system to a particular material type; receiving instructions to advance a predetermined amount of material; causing one or more motors to advance a predetermined amount of material; receiving from one or more scales weight information for material advanced through the one or more feeder assemblies; verifying whether advanced material is in an amount substantially equal to the predetermined material weight; advancing additional material through the one or more feeder assemblies to total an amount substantially equal to the predetermined material weight if a first operation of the first motor failed to advance material in an amount substantially equal to the predetermined material weight; engaging the one or more releases to exit advanced material from one or more receptacles; and recording feeder performance statistics.

In various embodiments, the memory [702] of the computer [701] may store a calibration module [703] containing instructions to calibrate one or more sets of feeder assemblies, motors, scales, and computer to a particular material type. Calibration within the module may be accomplished through any number of means, but has the end purpose of tailoring the system to advance certain amounts of a specific material type. In particular, the calibration instructions in one embodiment of the invention determine the number of stepper motor steps required to advance a specific weight of a material type, as measured by a scale. These instructions may utilize a two point calibration formula bounding a target weight to formulate a slope and offset for determining material weight.

In various embodiments, the memory [702] of the computer [701] may store a motor module [704] containing instructions to operate the one or more motors corresponding to one or more feeder assemblies. The motor module contains instructions to initiate or terminate operation of the motor, and in various embodiments, contains instructions directing a stepper motor to take a certain number of steps, typically corresponding to a number necessary to advance a predetermined amount of material. Depending on the embodiment, the motor module contains instructions to operate the motors in continuous or non-continuous batch operation. The motor module may also contain instructions to operate the one or more motors at a specific rate, or for a specific length of time.

In some embodiments of the invention motor module instructions perform a first operation of a motor to advance material in an amount substantially equal to a predetermined material weight. In combination with the weighing module, discussed below, the motor module may contain instructions to direct the same motor to perform a second operation of the motor to advance additional material to total an amount substantially equal to the predetermined material weight if the first operation of the motor failed to advance sufficient material in an amount substantially equal to the predetermined weight. This is basically a "top-off" operation. Various embodiments contain instructions to repeat the first operation and second operation where necessary to top-off material to achieve an amount substantially equal to the predetermined weight. In embodiments with a plurality of motors and feeder assemblies the motor module contains the above instructions for each motor, and may also have timing or sequencing instructions to advance material through feeder assemblies in predetermined orders or times by sequencing operation of the motors in non-synchronous fashion.

In various embodiments, the memory [702] of the computer [701] may store a weighing module [705] containing instructions to receive or take weight measurements of material using the one or more scales. The weighing module may contain instructions to tare receptacle weights and/or take weight measurements of material advanced through a feeder assembly using one or more scales. The weighing module may also have instructions to verify that that the advanced material falls within a predetermined weight range. In combination with the motor module, discussed above, the weighing module may contain instructions to direct the motor to perform a second operation of the motor to advance additional material to total an amount substantially equal to the predetermined material weight if the first operation of the motor failed to advance sufficient material in an amount substantially equal to the predetermined weight.

In various embodiments, the memory [702] of the computer [701] may store a sorting module [706] containing instructions to sort advanced material. The sorting module may contain instructions to engage the release to exit material from one or more receptacles. In those embodiments with a plurality of feeder assemblies, the sorting module may also have timing or sequencing instructions to release material from receptacles in predetermined orders or times by sequencing operation. Also, the sorting module may have instructions to operate the funnel structures [507, 508] capable of variable positioning to further sort material. For example, the module may have instructions to position a funnel to direct material into a first location if advanced material falls within a predetermined weight range. Likewise, the module may have instructions to position a funnel to direct material into a second location if the advanced material exceeds the predetermined weight range. In one embodiment, such sorting determines whether the advanced material is accepted or rejected for purposes of further processes.

In various embodiments, the memory [702] of the computer [701] may store a program module [707] containing instructions allowing for the integration of the instructions of the other modules into discrete, user-enabled routines.

In various embodiments, the memory [702] of the computer [701] may store a performance module [708] containing instructions to record feeder performance statistics. Such statistics may include, but are not limited to: the number of first operations performed; the number of second operations performed; weights of material advanced; location and positioning of funnel structures, receptacles, and other components; and sorting to first, second, or other locations. These statistics may be in connection with individual feeder assemblies or pluralities of feeder assemblies.

In various embodiments, the memory [702] of the computer [701] may store an interface module [709] containing instructions to operate an interface that allows a user to input information into, or receive information from, the computer. For example, the interface module may allow a user to perform calibration specific to a material type or run the various routines of the program module. The module may also allow the user to obtain feeder performance statistics from the performance module.

Figure 8:
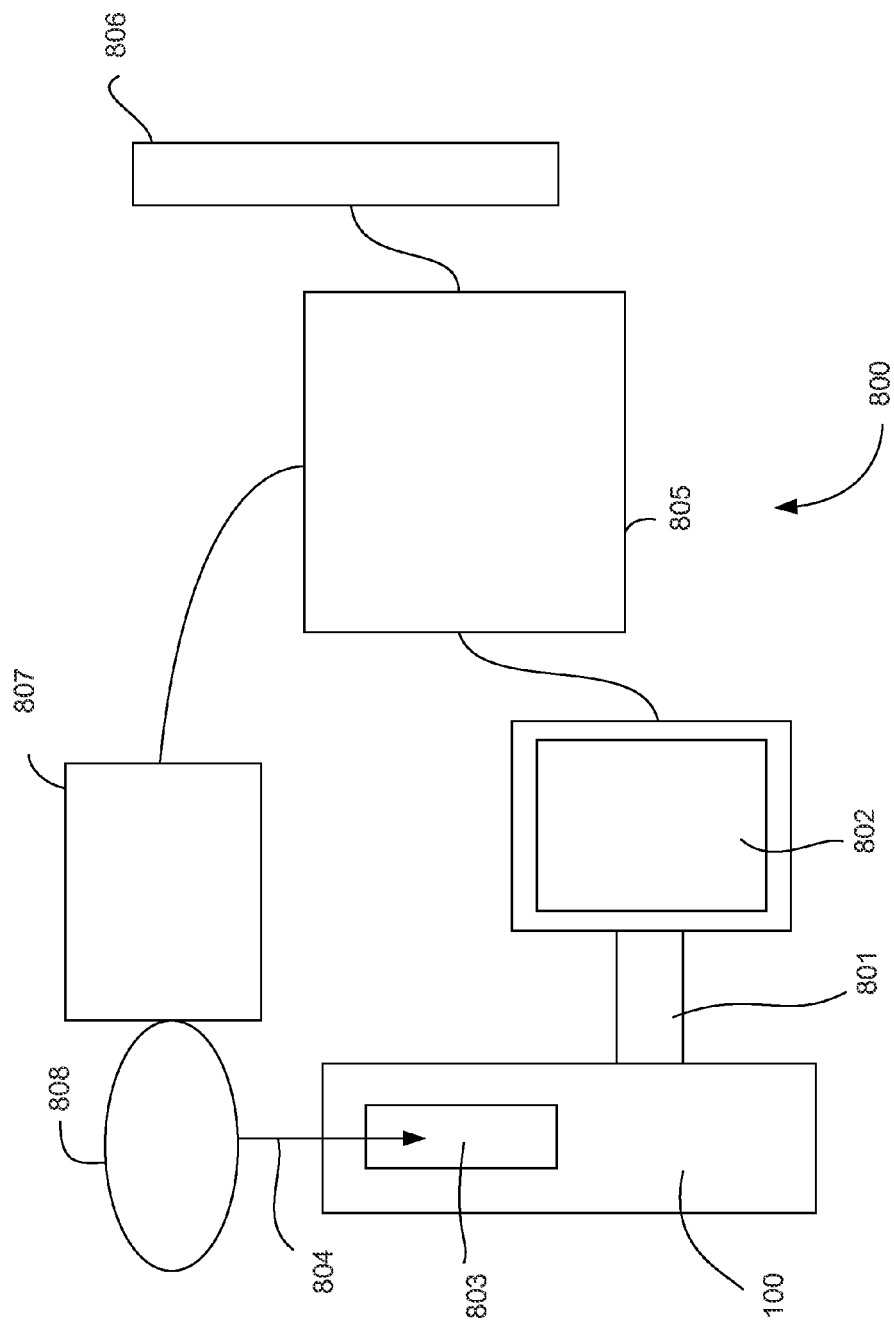
FIG. 8 is a block diagram of one embodiment of the material feeder system.

FIG. 8 shows a block diagram of a different configuration of one embodiment of the system. The material feeder system [800] may include one or more of: a motor [802] configured to rotate the feeder spool [803] within the feeder assembly [100] via a shaft [801], thereby allowing gravity fed material [804] to be dispensed; a computer [805] in communication with the motor [802] and configured to control the same; a user interface [806] in communication with the computer [805]; and a weigh scale [807] in communication with the computer [805] and connected to a material supply [808]. It is understood that one or more of the abovementioned components may be connected via any number of wired or wireless means. In this configuration, weighing is not performed using the receptacle, but from the material supply.

Figure 9:
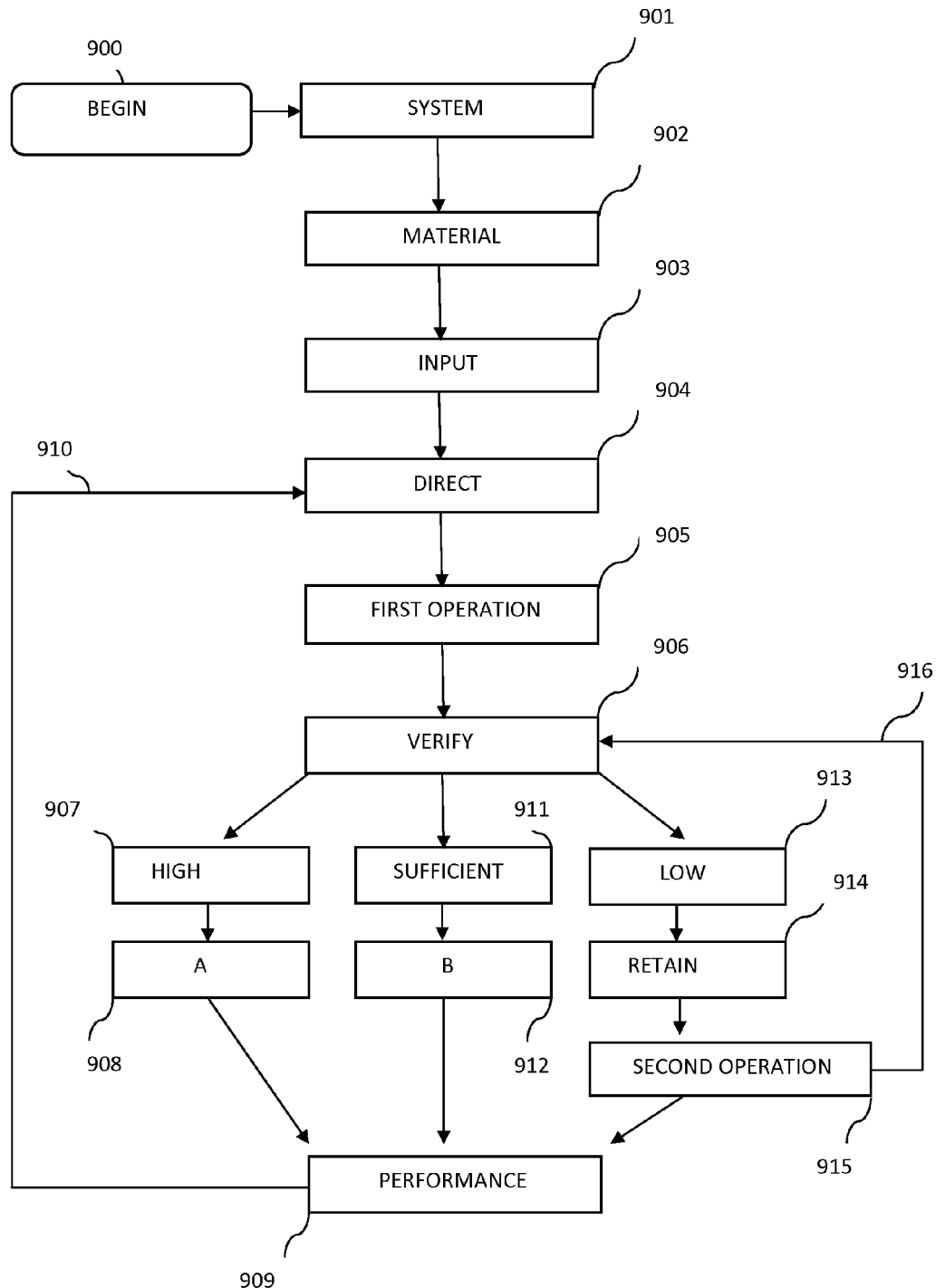
FIG. 9 is a flow chart for one embodiment of a method of using the material feeder system.

Accordingly, a method for using the material feeder [900] is provided. Referring now to FIG. 9, a material feeder system [901] is provided. Any of the embodiments of the system described above are suitable, but at a minimum, a system should be provided that includes at least one feeder assembly, motor, scale, and computer. In one embodiment of the invention, the material feeder system comprises a plurality of some of these components: first and second feeder assemblies for advancing material, wherein each assembly includes a housing with an inlet aperture for receiving material into the housing, an outlet aperture for exiting material from the housing, a bore located between the inlet and outlet apertures the bore having a key along a length of its circumference and the key forming a barrier, a feeder spool configured to rotate within the bore, the spool having a channel disposed within its outer circumference for advancing material when the spool is rotated, the channel further shaped to achieve a close fit with the key; and a shaft in communication with the feeder spool and disposed coaxially relative to the feeder spool aperture; the system further comprises: first and second motors wherein the first motor is configured to connect to the shaft of the first feeder assembly and the second motor is configured to connect to the shaft of the second feeder assembly, the first motor capable of rotating the spool within the first assembly to advance material through the first assembly's housing when material is in contact with the first assembly's spool, and the second motor capable of rotating the spool within the second assembly's housing when material is in contact with the second assembly's spool; first and second receptacles wherein the first receptacle is capable of receiving material exited from the first feeder assembly's housing and the second receptacle is capable of receiving material exited from the second feeder assembly's housing; first and second scales, wherein the first scale is connected to the first receptacle and capable of weighing a material amount in the first receptacle, and wherein the second scale is connected to the second receptacle and capable of weighing a material amount in the second receptacle; and a computer with memory for storing modules for program control and manipulating data in memory, the computer further in communication with the first and second motors and capable of performing a first operation of the first motor to advance material in an amount substantially equal to a predetermined material weight and further capable of performing a first operation of the second motor to advance material in an amount substantially equal to a predetermined material weight; the computer is further in communication with the first and second scales and capable of executing instructions to receive weight information from the first scale to verify whether the material advanced in the first operation of the first scale is an amount substantially equal to the predetermined material weight, and further capable of executing instructions to receive weight information from the second scale to verify whether the material advanced in the first operation of the second scale is an amount substantially equal to the predetermined material weight; the computer further capable of performing a second operation of the first motor to advance additional material to total an amount substantially equal to the predetermined material weight if the first operation of the first motor failed to advance material in an amount substantially equal to the predetermined material weight, the computer further capable of performing a second operation of the second motor to advance additional material to total an amount substantially equal to the predetermined material weight if the first operation of the second motor failed to advance sufficient material in an amount substantially equal to the predetermined material weight; and the computer further capable of recording feeder performance statistics; and operable to relocate advanced material to a second location.

A material supply is provided [902] for entry into the system. In the preferred embodiment of the invention, the material is small and particulate in nature. Volatile particulate materials such as gunpowder are optimal for use within the system and method. A user enters into the computer of the material feeder system parameters defining a predetermined material weight to be advanced through each feeder assembly of the system [903]. In various embodiments, this may be a number of steps for stepper motor rotation. The computer directs the system to advance material through the first feeder assembly in a first operation of the first motor [904]. The material is advanced through the first feeder assembly in a first operation [905]. The computer, using the first scale, verifies [906] that the advanced material falls within the parameters, or that it is in an amount substantially equal to the predetermined material weight. In certain embodiments, there are three possible immediate outcomes from this verification process: (1) the material advanced exceeds the parameters; (2) the material advanced falls within the parameters or is an amount substantially equal to the predetermined material weight; and (3) the material advanced is below the parameters. Each is addressed in turn.

First, if the advanced material weight is too high [907], the computer directs the material to Location A [908], typically a "reject" or resupply bin. In one embodiment of the invention, the computer does this by releasing a trap door within a receptacle and positioning a funnel structure in a first position to deliver the material to Location A. The computer then records this event [909] as a feeder performance statistic. The method then repeats [910] either with the same feeder assembly, motor, and scale, or a second feeder assembly motor, and scale, and so on depending on the number of feeder assemblies, motors, and scales.

If the advanced material weight is sufficient [911], falls within the parameters, or is an amount substantially equal to the predetermined material weight, the computer directs the material to Location B [912] typically an "accept" bin or location for further processing. In one embodiment of the invention, the computer does this by releasing a trap door within a receptacle and positioning a funnel structure in a second position to deliver the material to Location B. The computer then records this event [909] as a feeder performance statistic. The method then repeats [910] either with the same feeder assembly, motor, and scale, or a second feeder assembly motor, and scale, and so on depending on the number of feeder assemblies, motors, and scales.

If the first operation failed to advance a sufficient material in an amount substantially equal to the predetermined material weight, or the advanced amount is low [913], the advanced material is temporarily retained [914]. In various embodiments, retention is in the first receptacle. The computer then engages the system to perform a second operation to advance additional material to total an amount substantially equal to the predetermined weight [915]. This is verified [906], repeating [916] the abovementioned steps. Again, these events are recorded as feeder performance statistics [909]. The method then repeats [910] either with the same feeder assembly, motor, and scale, or a second feeder assembly motor, and scale, and so on depending on the number of feeder assemblies, motors, and scales.

The invention claimed is:

1. A material feeder system comprising:
a feeder assembly for advancing particulate material, wherein said assembly includes
a housing with
an inlet aperture for receiving material into the housing,
an outlet aperture for exiting material from the housing,
a bore located between the inlet and outlet apertures the bore having a key on a length of its circumference and the key forming a barrier, the assembly further having
a feeder spool configured to rotate within the bore, the spool having
a channel disposed within its outer circumference for advancing material when the spool is rotated, the channel further shaped to achieve a close fit with the key; and the assembly further having
a shaft in communication with the feeder spool and disposed coaxially relative to a feeder spool aperture,
the system further capable of introducing particulate material into the feeder spool though gravity alone without immediate mechanical feed assist.

2. The system of claim 1, wherein a plurality of circumferentially spaced contours are disposed within the channel to provide traction to the feeder spool with respect to material.

3. The system of claim 2, wherein a first set of contours are located on a first side of the channel and are offset in relation to a second set of contours on a second and opposite side of the channel.

4. The system of claim 1 further comprising a motor configured to connect to the shaft of the feeder assembly and capable of rotating the spool within the assembly to advance material through the housing when material is in contact with the spool.

5. The system of claim 4 further comprising a receptacle for receiving material exited from the housing, and a scale, connected to said receptacle, for weighing a material amount in the receptacle.

6. The system of claim 5 further comprising a computer with memory for storing modules for program control and manipulating data in memory, the computer further in communication with the motor and capable of performing a first operation of the motor to advance material in an amount substantially equal to a predetermined material weight.

7. The system of claim 6, wherein the computer is further in communication with the scale and capable of executing instructions to receive weight information from the scale to verify whether the material advanced in the first operation is an amount substantially equal to the predetermined material weight.

8. The system of claim 7, wherein the computer is capable of performing a second operation of the motor to advance additional material to total an amount substantially equal to the predetermined material weight if a first operation of the motor failed to advance sufficient material in an amount substantially equal to the predetermined material weight.

9. The system of claim 6, wherein the computer is further capable of recording feeder performance statistics.

10. A material feeder system comprising:
a feeder assembly for advancing particulate material, wherein said assembly includes
a housing with
an inlet aperture for receiving material into the housing, an outlet aperture for exiting material from the housing,
a bore located between the inlet and outlet apertures the bore having a key along a length of its circumference and the key forming a barrier, the assembly further having
a feeder spool configured to rotate within the bore, the spool having
a channel disposed within its outer circumference for advancing material when the spool is rotated,
a plurality of circumferentially spaced contours disposed within the channel to provide traction to the feeder spool with respect to the material, wherein a first set of contours are located on a first side of the channel and are offset in relation to a second set of contours on a second and opposite side of the channel, the channel further shaped to achieve a close fit with the key; and the assembly further having
a shaft in communication with the feeder spool and disposed coaxially relative to a feeder spool aperture.

11. A material feeder system comprising:
a feeder assembly for advancing particulate material, wherein said assembly includes
a stationary housing with
an inlet aperture for receiving material into the housing,
an outlet aperture for exiting material from the housing,
a bore located between the inlet and outlet apertures the bore having a key on a length of its circumference and the key forming a barrier, the assembly further having
a feeder spool configured to rotate within the bore, the spool having
a channel disposed within its outer circumference for advancing material when the spool is rotated, the channel further shaped to achieve a close fit with the key; and the assembly further having
a shaft in communication with the feeder spool and disposed coaxially relative to a feeder spool aperture.

12. A material feeder system comprising:
first and second feeder assemblies for advancing particulate material, wherein each assembly includes
a housing with
an inlet aperture for receiving material into the housing,
an outlet aperture for exiting material from the housing,
a bore located between the inlet and outlet apertures the bore having a key on a length of its circumference and the key forming a barrier,
a feeder spool configured to rotate within the bore, the spool having a channel disposed within its outer circumference for advancing material when the spool is rotated, the channel further shaped to achieve a close fit with the key; and
a shaft in communication with the feeder spool and disposed coaxially relative to a feeder spool aperture; the system further comprising:
first and second motors wherein
the first motor is configured to connect to the shaft of the first feeder assembly and the second motor is configured to connect to the shaft of the second feeder assembly, the first motor capable of rotating the spool within the first assembly to advance material through the first assembly's housing when material is in contact with the first assembly's spool, and the second motor capable of rotating the spool within the second assembly's housing when material is in contact with the second assembly's spool;
first and second receptacles wherein
the first receptacle is capable of receiving material exited from the first feeder assembly's housing and the second receptacle is capable of receiving material exited from the second feeder assembly's housing;
first and second scales, wherein
the first scale is connected to the first receptacle and capable of weighing a material amount in the first receptacle, and wherein the second scale is connected to the second receptacle and capable of weighing a material amount in the second receptacle; and
a computer with memory for storing modules for program control and manipulating data in memory, the computer further
in communication with the first and second motors and capable of performing a first operation of the first motor to advance material in an amount substantially equal to a predetermined material weight and further capable of performing a first operation of the second motor to advance material in an amount substantially equal to a predetermined material weight,
the system further capable of introducing particulate material into the feeder spool though gravity alone without immediate mechanical feed assist.

13. The system of claim 12, wherein a plurality of circumferentially spaced contours are disposed within the channels of the first and second assemblies to provide traction to the feeder spools with respect to material.

14. The system of claim 12, wherein the computer is further in communication with the first and second scales and capable of executing instructions to receive weight information from the first scale to verify whether the material advanced in the first operation of the first scale is an amount substantially equal to the predetermined material weight, and further capable of executing instructions to receive weight information from the second scale to verify whether the material advanced in the first operation of the second scale is an amount substantially equal to the predetermined material weight.

15. The system of claim 14, wherein the computer is capable of performing a second operation of the first motor to advance additional material to total an amount substantially equal to the predetermined material weight if the first operation of the first motor failed to advance material in an amount substantially equal to the predetermined material weight, the computer further capable of performing a second operation of the second motor to advance additional material to total an amount substantially equal to the predetermined material weight if the first operation of the second motor failed to advance sufficient material in an amount substantially equal to the predetermined material weight.

16. The system of claim 14, wherein the computer is in communication with the release of the first receptacle and operable to engage the release to exit material from the first receptacle and wherein the computer is in communication with the release of the second receptacle and operable to engage the release to exit material from the second receptacle.

17. The system of claim 16, further comprising one or more funnel structures located below the feeder assemblies and capable of being variably positioned within the system at first and second locations for exiting material from the receptacles.

18. The system of claim 17, the computer further operable to move the funnel structures between locations.

19. The system of claim 12, wherein the computer is further capable of recording feeder performance statistics.

20. The system of claim 12, wherein the first receptacle includes a release and aperture for exiting material from the first receptacle and wherein the second receptacle contains a release and aperture for exiting material from the second receptacle.

21. A material feeder system comprising:
first and second feeder assemblies for advancing particulate material, wherein each assembly includes
a housing with
an inlet aperture for receiving material into the housing,
an outlet aperture for exiting material from the housing,
a bore located between the inlet and outlet apertures the bore having a key on a length of its circumference and the key forming a barrier,
a feeder spool configured to rotate within the bore, the spool having
a channel disposed within its outer circumference for advancing material when the spool is rotated, the channel further shaped to achieve a close fit with the key; and
a shaft in communication with the feeder spool and disposed coaxially relative to the feeder spool aperture; the system further comprising:
first and second motors wherein
the first motor is configured to connect to the shaft of the first feeder assembly and the second motor is configured to connect to the shaft of the second feeder assembly, the first motor capable of rotating the spool within the first assembly to advance material through the first assembly's housing when material is in contact with the first assembly's spool, and the second motor capable of rotating the spool within the second assembly's housing when material is in contact with the second assembly's spool;
first and second receptacles wherein
the first receptacle is capable of receiving material exited from the first feeder assembly's housing and the second receptacle is capable of receiving material exited from the second feeder assembly's housing;
first and second scales, wherein
the first scale is connected to the first receptacle and capable of weighing a material amount in the first receptacle, and wherein the second scale is connected to the second receptacle and capable of weighing a material amount in the second receptacle; and
a computer with memory for storing modules for program control and manipulating data in memory, the computer further in communication with the first and second motors and capable of performing a first operation of the first motor to advance material in an amount substantially equal to a predetermined material weight and further capable of performing a first operation of the second motor to advance material in an amount substantially equal to a predetermined material weight, the computer further in communication with the first and second scales and capable of executing instructions to receive weight information from the first scale to verify whether the material advanced in the first operation of the first scale is an amount substantially equal to the predetermined material weight, and further capable of executing instructions to receive weight information from the second scale to verify whether the material advanced in the first operation of the second scale is an amount substantially equal to the predetermined material weight, the computer further in communication with the release of the first receptacle and operable to engage the release to exit material from the first receptacle and wherein the computer is in communication with the release of the second receptacle and operable to engage the release to exit material from the second receptacle and
one or more funnel structures located below the feeder assemblies and capable of being variably positioned within the system at first and second locations for exiting material from the receptacles.

22. The system of claim 21, the computer further operable to move the funnel structures between locations.

* * * * *